United States Patent Office 3,120,516
Patented Feb. 4, 1964

3,120,516
4,4-DIMETHYLSTEROIDS AND PREPARATION THEREOF
Raymond O. Clinton, North Greenbush Township, and Robert G. Christiansen, Schodack Center, N.Y., assignors to Sterling Drug Inc., New York, N.Y., a corporation of Delaware
No Drawing. Filed Mar. 1, 1957, Ser. No. 643,258
5 Claims. (Cl. 260—239.55)

This invention relates to novel 4,4-dimethylsteroids, and in particular it is concerned with compounds of the androstene and pregnene series having the formula

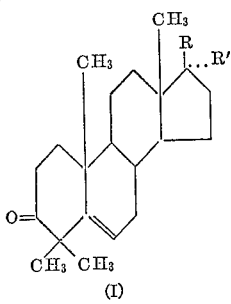
(I)

wherein R represents hydroxy, lower-alkanoyloxy, 1-hydroxyethyl, or acetyl radicals, and R' represents hydrogen, or a lower-alkyl radical. The invention also relates to a process for the preparation of said compounds, and to intermediates therefor and derivatives thereof.

In the above general Formula I, R represents hydroxy, lower-alkanoyloxy, 1-hydroxyethyl, or acetyl radicals. When R stands for a lower-alkanoyloxy radical, it represents a hydroxy radical esterified with a lower fatty acid. The lower-alkanoyloxy radical can be straight or branched and preferably has from one to about four carbon atoms, thus including such acyloxy groups as formyloxy, acetoxy, propionyloxy, butyryloxy, and isobutyryloxy.

In the above general Formula I, R' represents hydrogen, or a lower-alkyl radical. When R' stands for a lower-alkyl radical, it has preferably from one to about four carbon atoms, thus including such groups as methyl, ethyl, propyl, isopropyl, butyl, isobutyl, and the like.

The compounds of the invention are prepared by reacting a compound having the formula

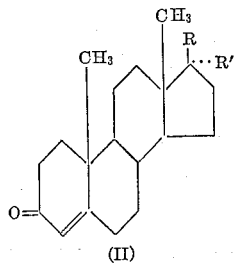
(II)

with a methyl ester of a strong acid in the presence of a strong base under anhydrous conditions. The methyl ester of a strong acid can be a methyl halide such as methyl chloride, methyl bromide, or methyl iodide, preferably methyl iodide in view of its relatively low volatility, or methyl sulfate, methyl methane-sulfonate, methyl p-toluenesulfonate, and the like. At least two molar equivalents of methyl ester per equivalent of steroid are used. The strong base can be any base capable of enolizing ketones, and includes such bases as sodium amide, potassium amide, sodium hydride, and the alkali metal alkoxides, viz. sodium methoxide, sodium ethoxide, potassium methoxide, potassium tertiary-butoxide, potassium tertiary-amyl-oxide, and the like. The potassium derivatives of branched chain alkanols of about four to six carbon atoms are the most efficient bases for the process of the invention. The reaction takes place readily at ordinary temperatures.

The structure of the products of Formula I was proved by the fact that they react with furfural under alkaline conditions to form furfurylidene derivatives having the following formula:

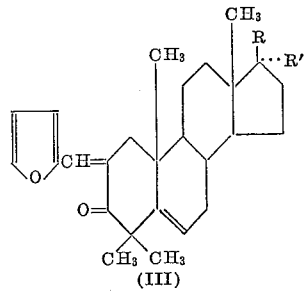
(III)

Formation of the furfurylidene derivative III requires the presence of a methylene group ($CH_2$) adjacent to the carbonyl group. The only such position available in the compounds of structure II is the 2-position, so the furfurylidene radical must have entered there. Since chemical analysis showed the introduction of two methyl groups, they must have both entered the 4-position with concurrent shift of the double bond to the 5,6-position. The compounds of Formula III are thus useful in establishing the structure of the compounds of Formula I.

In the case where R is an acetyl group, as in compounds having the partial formula

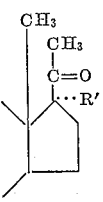

the 20-keto group is converted to a ketal derivative prior to alkylation in order to prevent concurrent alkylation at the 21-position.

Endocrinological evaluation of the compounds of the invention has shown that they possess anabolic properties while lacking any appreciable degree of sex hormonal properties, and this indicates that the compounds are useful in the treatment of conditions arising from poor nitrogen utilization and various debilitating diseases. The compounds of the invention can be prepared for use by dispersing them in an aqueous suspension or by dissolving them in a therapeutically acceptable oil or oil-water emulsion for parenteral administration, in the same way that conventional steroidal hormones are formulated.

The compounds of the invention are also useful as intermediates in the preparation of the corresponding compounds having the double bond in the 5,6-position saturated, which compounds also possess anabolic activity. The saturation of the double bond is carried out by catalytic hydrogenation.

The following examples will further illustrate the invention without the latter being limited thereby.

EXAMPLE 1

4,4-Dimethyl-5-Pregnen-20β-Ol-3-One

[I; R is CH(OH)CH₃, R' is H]

Potassium metal (2.4 g., 0.06 mole) was dissolved in 200 ml. of tertiary-amyl alcohol which had previously been refluxed over sodium for two hours and then distilled directly into the reaction flask. All operations were carried out in a nitrogen atmosphere. 4-pregnen-20β-ol-3-one (6.22 g., 0.0196 mole) was then added, the mixture was cooled in an ice-salt bath, and 16.0 g. (0.12 mole) of methyl iodide was then added dropwise. The reaction mixture was stirred for fifty minutes and then allowed to warm to room temperature with stirring for one and one-half hours. Ice water and sodium bicarbonate were added, and the mixture was concentrated to a small volume at reduced pressure. The solid product was collected by filtration, washed with water and dried, giving 3.03 g. of 4,4-dimethyl-5-pregnen-20β-ol-3-one, M.P. 148–155° C. When recrystallized first from an ethyl acetate-ether mixture and then from acetone there was obtained a sample having the M.P. 158–161.5° C. (corr.).

*Analysis.*—Calcd. for $C_{23}H_{36}O_2$: C, 80.18; H, 10.53. Found: C, 80.00; H, 10.56.

By replacement of the 4-pregnen-20β-ol-3-one in the preceding preparation by a molar equivalent amount of 17α-methyl-4-pregnene-3,20-dione, there can be obtained 4,4,17α-trimethyl-5-pregnene-3,20-dione [I; R is $COCH_3$, R' is $CH_3$].

The methyl iodide in the preceding preparation can be replaced by a molar equivalent amount of methyl chloride, methyl bromide, methyl sulfate or methyl methanesulfonate, and the same product obtained.

EXAMPLE 2

4,4-dimethyl-5-pregnene-3,20-dione 20 - ethylene ketal was prepared from 4.88 g. (0.0136 mole) of 4-pregnene-3,20-dione 20-ethylene ketal, 1.6 g. (0.045 mole) of potassium, 12.8 g. (0.09 mole) of methyl iodide and 200 ml. of tertiary-amyl alcohol according to the manipulative procedure described above in Example 1. There was thus obtained 5.06 g. of 4,4-dimethyl-5-pregnene-3,20-dione 20-ethylene ketal, M.P. 160–185° C. Recrystallization from acetone gave a sample having the M.P. 186–192° C.

A 3.95 g. sample of 4,4-dimethyl-5-pregnene-3,20-dione 20-ethylene ketal was refluxed for thirty minutes with dilute acetic acid. The product was collected by filtration, washed with water and dried, giving 3.52 g. of 4,4-dimethyl-5-pregnene-3,20-dione [I; R is $COCH_3$, R' is H], M.P. 144–146.5° C. (corr.) when recrystallized first from an ethyl acetate-ether mixture and then from acetone, $[\alpha]_D^{25}=62.8°\pm0.2°$ (1% in chloroform).

*Analysis.*—Calcd. for $C_{23}H_{34}O_2$: C, 80.65; H, 10.01. Found: C, 80.35; H, 9.88.

EXAMPLE 3

(a) *4,4,17α-Trimethyl-5-Androsten-17β-Ol-3-One*

[I; R is OH, R' is $CH_3$]

Potassium metal (11.0 g., 0.28 mole) was dissolved in 400 ml. of tertiary-butyl alcohol which had been previously refluxed for two hours over sodium and then distilled directly into the reaction flask. All operations were carried out in a nitrogen atmosphere. The mixture was refluxed and stirred until solution was complete, then 21.17 g. (0.07 mole) of 17α-methyl-4-androsten-17β-ol-3-one was added and the mixture cooled in an ice bath. Methyl iodide (35 ml., 0.56 mole) was then added, and the reaction mixture was stirred for fifteen minutes in an ice bath and then at room temperature for two hours. After the reaction mixture was allowed to stand for sixteen hours at room temperature, 400 ml. of water was added and the organic solvents were removed in vacuo. The mixture was diluted to a volume of 700 ml. with water, and the product was collected by filtration, washed with water and dried at 70° C. The product was dissolved in a benzene-hexane (1:10) mixture and chromatographed on an 800 g. column of aluminum oxide. The column was eluted with the solvent series hexane, benzene, ether and methanol. The ether and methanol brought out the desired product which was recrystallized from acetone and from benzene, giving 4,4,17α-trimethyl-5-androsten-17β-ol-3-one, M.P. 195.5–201.5° C. (corr.), $[\alpha]_D^{23}=-32.4°\pm0.2°$ (1% in chloroform), ultraviolet maximum at 288 mμ (ethanol).

*Analysis.*—Calcd. for $C_{22}H_{34}O_2$: C, 79.95; H, 10.37. Found: C, 79.72; H, 10.10.

(b) *2-Furfurylidene-4,4,17α-Trimethyl-5-Androsten-17β-Ol-3-One*

Freshly distilled furfural (2 ml.) and 5 ml. of 35% aqueous sodium hydroxide solution was added to a solution of 1.0 g. of 4,4,17α-trimethyl-5-androsten-17β-ol-3-one in 75 ml. of 95% ethanol, and the mixture was allowed to stand at room temperature for eighteen hours. The reaction mixture was diluted with water, extracted with three 25 ml. portions of methylene dichloride, and the extracts were washed with water and dried over anhydrous sodium sulfate. The extracts were concentrated, and the residue was crystallized from hexane, giving 1.17 g. of 2-furfurylidene-4,4,17α-trimethyl-5-androsten-17β-ol-3-one, M.P. 218–220° C. A sample when recrystallized first from an ethyl acetate-petroleum ether mixture and then from methanol had the M.P. 218.5–221° C. (corr.), $[\alpha]_D^{24}=-27.0°\pm0.6°$ (1% in chloroform).

*Analysis.*—Calcd. for $C_{27}H_{36}O_3$: C, 79.37; H, 8.88. Found: C, 79.24; H, 8.72.

By replacement of the 17α-methyl-4-androsten-17β-ol-3-one in part (a) of the preceding example by a molar equivalent amount of 17α-ethyl-4-androsten-17β-ol-3-one or 17α-butyl-4-androsten-17β-ol-3-one, there can be obtained, respectively, 4,4-dimethyl-17α-ethyl-5-androsten-17β-ol-3-one or 4,4-dimethyl-17α-butyl-5-androsten-17β-ol-3-one.

4,4,17α-trimethyl-5-androsten-17β-ol-3-one can be reacted with acetic anhydride or propionic anhydride in pyridine to yield, respectively, 17β-acetoxy-4,4,17α-trimethyl-5-androsten-3-one or 17β-propionoxy-4,4,17α-trimethyl-5-androsten-3-one.

EXAMPLE 4

(a) 4,4-dimethyl-5-androsten-17β-ol-3-one [I; R is OH, R' is H] was prepared from 17.30 g. (0.06 mole) of testosterone, 9.0 g. (0.23 mole) of potassium, 29 ml. (0.46 mole) of methyl iodide and 400 ml. of tertiary-butyl alcohol according to the manipulative procedure described above in Example 3, part (a). The product was purified by chromatography and recrystallized successively from acetone, benzene and methanol, giving 4,4-dimethyl-5-androsten-17β-ol-3-one, M.P. 196–202.5° C. (corr.), $[\alpha]_D^{25}=-13.2°$ (1% in chloroform).

*Analysis.*—Calcd. for $C_{21}H_{32}O_2$: C, 79.70; H, 10.19. Found: C, 79.83; H, 10.41.

(b) 2-furfurylidene-4,4-dimethyl-5-androsten-17β-ol-3-one was prepared from 1.0 g. of 4,4-dimethyl-5-androsten-17β-ol-3-one, 2 ml. of furfural, 5 ml. of 35% aqueous sodium hydroxide and 75 ml. of 95% ethanol according to the manipulative procedure described above in Example 3, part (b). The product had the M.P. 217–219° C. (corr.), $[\alpha]_D^{23}=-1.3°\pm0.3°$ (1% in chloroform).

*Analysis*—Calcd. for $C_{26}H_{34}O_3$: C, 79.15; H, 8.69. Found: C, 79.25; H, 8.47.

EXAMPLE 5

*17β-Propionoxy-4,4-Dimethyl-5-Androsten-3-One*

[I; R is $OCOCH_2CH_3$, R' is H]

A solution of 2.00 g. of 4,4-dimethyl-5-androsten-17β-ol-3-one in 20 ml. of pyridine and 15 ml. of freshly distilled propionic anhydride was allowed to stand at room temperature for seventeen hours. The reaction mixture was then diluted with water to a volume of 400 ml., allowed to stand for one hour, and the crystalline product was extracted with methylene dichloride and the extracts washed with water and dilute hydrochloric acid. The methylene dichloride solution was dried over anhydrous sodium sulfate, concentrated, and the residue recrystallized from methanol and from hexane, giving 17β-propionoxy-4,4-dimethyl-5-androsten-3-one, M.P. 116.5–120° C. (corr.), $[\alpha]_D^{24}=-24.3°\pm0.7°$ (1% in chloroform).

*Analysis.*—Calcd. for $C_{24}H_{36}O_3$: C, 77.37; H, 9.74. Found: C, 77.46; H, 10.02.

By replacement of the propionic anhydride in the preceding preparation by a molar equivalent amount of formic acid (in the presence of acetic anhydride), butyric anhydride or caproyl chloride, there can be obtained, respectively, 17β-formyloxy-4,4-dimethyl-5-androsten-3-one, 17β-butyryloxy-4,4-dimethyl-5 - androsten - 3 - one or 17β-caproyloxy-4,4-dimethyl-5-androsten-3-one.

We claim:
1. 4,4-dimethyl-5-pregnen-20β-ol-3-one.
2. 4,4-dimethyl-5-pregnene-3,20-dione.
3. 4,4-dimethyl-5-pregnene-3,20-dione 20-ethylene ketal.
4. 2-furfurylidene-4,4,17α-trimethyl-5-androsten-17β-ol-3-one.
5. 2-furfurylidene-4,4-dimethyl-5-androsten-17β - ol - 3-one.

References Cited in the file of this patent
UNITED STATES PATENTS 2,813,880   Campbell _____ Nov. 19, 1957

OTHER REFERENCES

Adams et al.: Chem. Soc. J., November 1956, pp. 4490–4495.